UNITED STATES PATENT OFFICE.

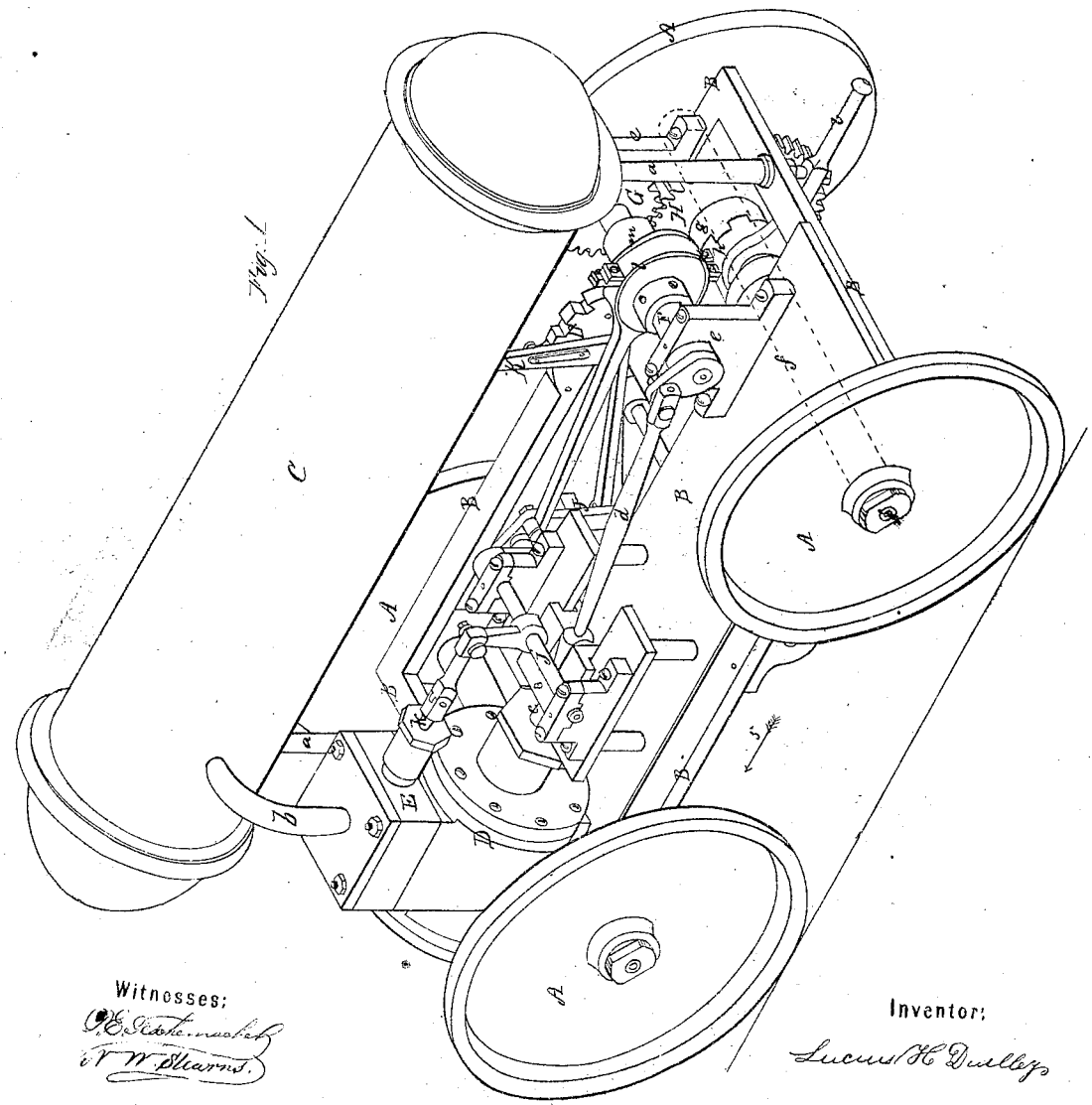

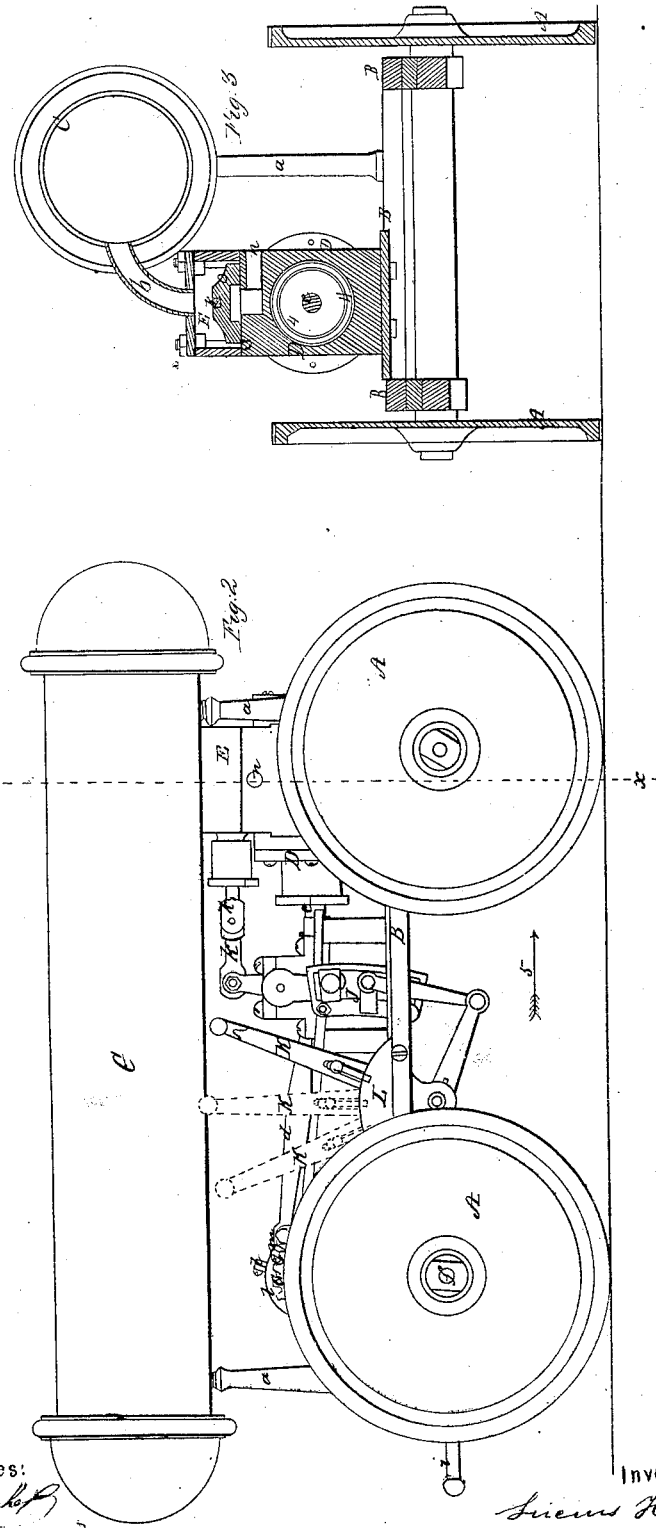

LUCIUS H. DWELLEY, OF DORCHESTER, MASSACHUSETTS.

IMPROVEMENT IN AIR-BRAKES FOR CARS.

Specification forming part of Letters Patent No. 51,158, dated November 28, 1865.

*To all whom it may concern:*

Be it known that I, LUCIUS H. DWELLEY, of Dorchester, in the county of Norfolk and State of Massachusetts, have invented an Atmospheric Brake for Railway-Cars and other Vehicles, of which the following is a full, clear, and exact description, reference being had to the accompanying drawings, making part of this specification, in which—

Figure 1 is a perspective view of my improved brake as applied to the wheels of a railway-car. Fig. 2 is a side elevation of the same. Fig. 3 is a transverse vertical section through the same on the line $x$ $x$ of Fig. 2.

In starting railway-cars a considerable amount of power is required, and in street-cars, where they make frequent stops, the sudden strain in starting is exceedingly exhausting to the horses.

My invention has for its object to economize the power used in stopping or checking the momentum of the car or other vehicle and employing it again for the purpose of starting, whereby I am enabled to avoid these objections; and my invention consists in forcing air into a receiver by means of a suitable air engine or pump, which is connected at the required time and driven by the wheels or axle of the car, the compressed air in the receiver soon retarding and stopping the engine, and with it the wheels of the car to which it is connected, and, the engine being reversed, the expansion of the air in the receiver serves to drive the engine a few revolutions, and thus assist in starting the car.

To enable others skilled in the art to understand and use my invention, I will proceed to describe the manner in which I have carried it out.

In the said drawings, A represents the wheels of the car, the journals of which run in suitable boxes attached to the platform B, on standards $a$ rising from which is supported the hollow air-receiver C.

D is the cylinder of an air engine or pump, the valve-chest E of which is connected with the receiver C by a pipe, $b$.

$c$ is the piston-rod, and $d$ the connecting-rod, which is attached to a crank on the end of a shaft, F, which runs in suitable bearings, $e$, rising from the platform B, and carries at its opposite end a gear, G, which meshes with a gear, H, running loosely on the axle $f$. The hub $g$ of this gear H is furnished with notches, and is revolved by means of the clutch $h$, which is attached to the axle $f$ by means of a spline, and is thrown in and out by means of the lever $i$, in a well-known manner.

J is a link-motion similar to that of a locomotive-engine, which is connected to the crank on the rock-shaft $j$, which actuates the valve-rod $k$, and is operated by the eccentrics $l$ $m$, in the usual manner.

K is the reverse-lever, by which the action of the engine is reversed. The details of the engine, however, as it is similar in every respect to an ordinary steam-engine, and forms no part of my present invention, will not be particularly described.

$n$, Figs. 2 and 3, is an opening (corresponding to the exhaust-port of a steam-engine) through which air is drawn into the cylinder D by the piston 4 as the engine is operated by the axle $f$, and thence forced through the pipe $b$ into the receiver C, which soon becomes filled with air, and as the engine continues to be operated the air within it is condensed or compressed until its pressure on the piston checks and finally stops the engine, and with it the axle and wheels to which it is connected, thus checking the momentum of the car as required. As soon as the car has come to a stop the reverse-lever K is thrown over into a position opposite the central notch in the segment L, which throws the valve $o$, Fig. 3, into a position to cover both the induction-ports of the cylinder D, and thus prevent the escape of the compressed air within the receiver C.

When it is desired to start the car, the lever K is thrown over into a position exactly the reverse of that which it occupied when the motion of the car was being checked, which reverses the action of the valve $o$ and allows the compressed air in the receiver C to enter the cylinder and drive the engine so as to revolve the wheels to which it is connected in the required direction to start the car forward, the number of revolutions given to the engine by the compressed air in the receiver C depending upon its size and the amount of pressure within it. As soon as the car is fairly started the engine is disconnected from the axle $f$ by means of the lever $i$.

Instead of one axle $f$ only being connected with the engine, both axles may be connected by means of a chain or other suitable mechanism, and the motion of all the wheels of the car can thus be checked when the brake is applied. The greater the weight and momentum of the car or vehicle the more the air will be compressed in the receiver, the gradual compression of the air checking the revolution of the wheels without shock.

It will thus be seen that the power employed to check the motion of the car is stored or saved and again employed in starting it.

When it is desired to check the wheels of the car more suddenly, the air is retained in a state of compression within the receiver C, in which case the engine is stopped in a shorter space of time after being connected with the axle $f$; or the air may be exhausted entirely from the receiver when it is desired to stop the wheels gradually, or it may be retained within it in any desired degree of compression—the greater the pressure within the receiver the sooner the stoppage of the engine and wheels of the car connected therewith.

A suitable safety-valve may be placed on the receiver C, so as to avoid all danger of explosion in case the pressure of the air within it should become too great.

Instead of the receiver C, a series of pipes placed in any convenient position may be employed, or any other form of receiver suitable for the purpose, and the engine may be placed in any suitable position on the car.

My invention will be found particularly applicable to street-cars, as it affords a great relief to the horses in starting; but it may be applied to any other description of car or vehicle to which it can be adapted.

I do not confine myself to any particular form or description of engine employed to force the air into the receiver C, but intend to employ that which may be found best adapted to the purpose.

If desired, the engine may be connected with the axle when the car is on a descending grade, so as to condense the air in the receiver, after which its expansive power can be employed to assist in driving the car when ascending a grade.

Operation: The parts being in the position represented in Figs. 1 and 2, (the car moving in the direction of the arrow 5,) and it being desired to apply the brake, the engine is connected with the axle $f$ by means of the clutch $h$ and lever $i$, as explained. The engine now commences to force air through the pipe $b$ into the receiver C, and as the air becomes compressed or condensed its pressure on the piston 4 retards and finally stops the engine, and with it the wheels of the car to which it is connected. As soon as the car has come to a stop the operator moves the reverse-lever K into the position seen in blue, Fig. 2, which causes the valve $o$ to cover both the induction-ports of the cylinder D, and thus prevent the escape of the compressed air in the receiver C. The car being now ready to start, the operator throws the reverse-lever K over into the position shown in red, Fig. 2, which moves the valve $o$ into such a position as to allow the compressed air to enter the cylinder and drive the engine and the wheels of the car in the required direction to start it forward. As soon as the condensed air in the receiver has expended its force in driving the engine and starting the car the operator disconnects the engine from the axle $f$ by means of the lever $i$ and throws the reverse-lever K into the position shown in black lines, Fig. 2, when the apparatus is ready to be operated as before.

If desired, however, the operator can allow the engine to remain connected until the air is partially or entirely exhausted from the receiver C.

When the car is running in the opposite direction (contrary to the arrow 5) the lever K is operated in a manner the reverse of that above described, and it is always necessary to reverse the action of the engine on starting the car forward; otherwise the expansion of the air in the receiver would drive the engine and wheels in the wrong direction.

What I claim as my invention, and desire to secure by Letters Patent, is—

1. Saving the power employed in stopping or checking the motion of a car or other vehicle and employing the same in starting it.

2. Forcing air into a receiver by a suitable pump or air engine operated by the wheels or axle of a car or other vehicle, the compressed air acting through suitable mechanism as a brake on the wheels.

3. Compressing air in a suitable receiver during the operation of stopping or checking the motion of a car or other vehicle and utilizing the expansive power of the air for the purpose of starting or driving it.

4. As an improvement in atmospheric brakes for railway cars and other vehicles, an air engine or pump operated by the wheels or axle of a car or other vehicle, in combination with an air-receiver, substantially as set forth.

LUCIUS H. DWELLEY.

Witnesses:
  P. E. TESCHEMACHER,
  N. W. STEARNS.